United States Patent

[11] 3,591,230

[72] Inventor George F. Cramer
Artist Drive, Nashville, Ind. 47448
[21] Appl. No. 806,450
[22] Filed Mar. 12, 1969
[45] Patented July 6, 1971

[54] EXPANDABLE TRAILER
7 Claims, 8 Drawing Figs.
[52] U.S. Cl............................................................ 296/23, 298/20
[51] Int. Cl..................................................... B60p 3/38
[50] Field of Search........................................... 296/23; 298/20

[56] References Cited
UNITED STATES PATENTS
3,158,402 11/1964 Clement........................ 298/20
3,102,649 9/1963 Whalen......................... 298/20

Primary Examiner—Philip Goodman
Attorney—Trask, Jenkins & Hanley

ABSTRACT: A trailer having linkage members connected to its drawbar for tilting the trailer bed when its wheels are held stationary and the drawbar is moved. The invention is embodied in an expandable camper trailer having a roof portion hinged to the trailer bed at the rearward end thereof. In this camper trailer embodiment the drawbar is connected to a forklike extension which has sections disposed adjacent the sides of the trailer bed, and which operates on a plurality of linkages to force the trailer roof upward and the bed downward, at their forward ends. Opening of the camper trailer is effected when a pulling force is applied to the drawbar, while blocking the wheels against movement. In another embodiment the trailer is tilted downward at its rearward end to facilitate the loading of cattle or heavy equipment on the trailer. In this embodiment the drawbar is formed of telescoping sections and is moved rearwardly, while the wheels are held stationary, thereby causing a linkage attached thereto to push the forward end of the trailer upwardly.

PATENTED JUL 6 1971 3,591,230
SHEET 1 OF 2
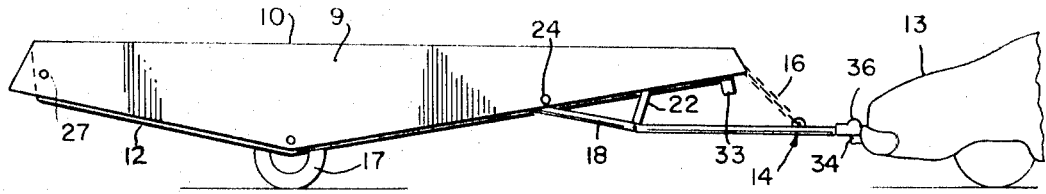
Fig. 1
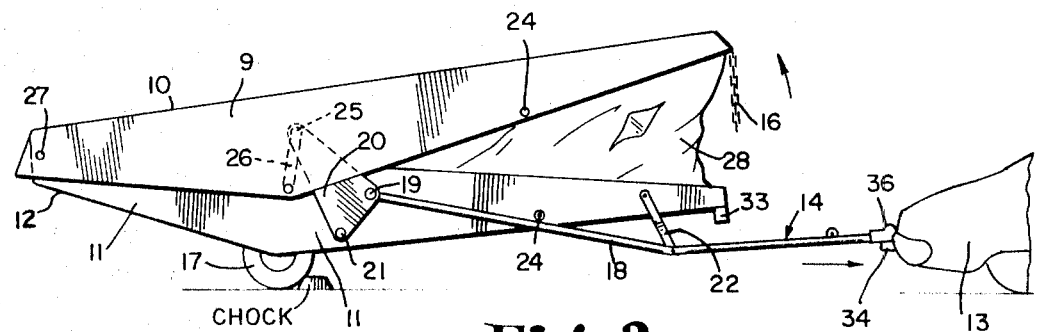
Fig. 2
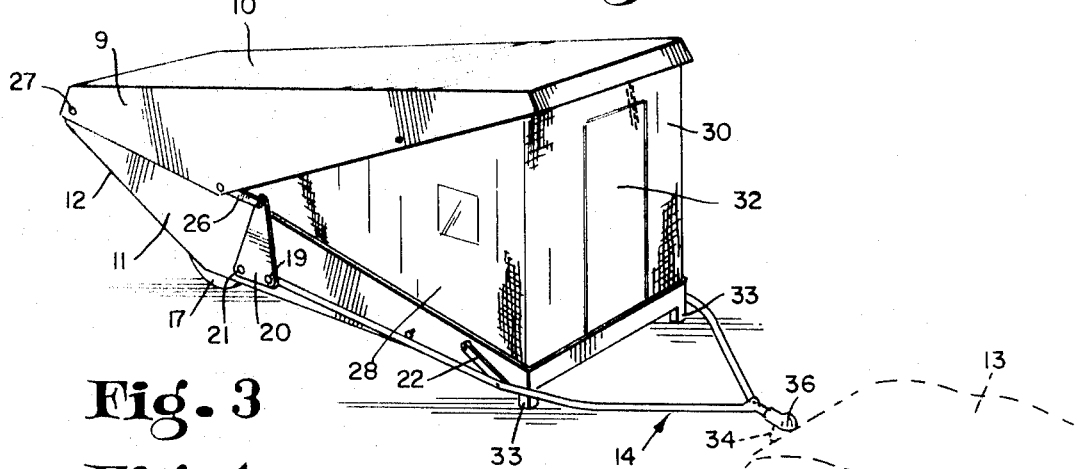
Fig. 3
Fig. 4
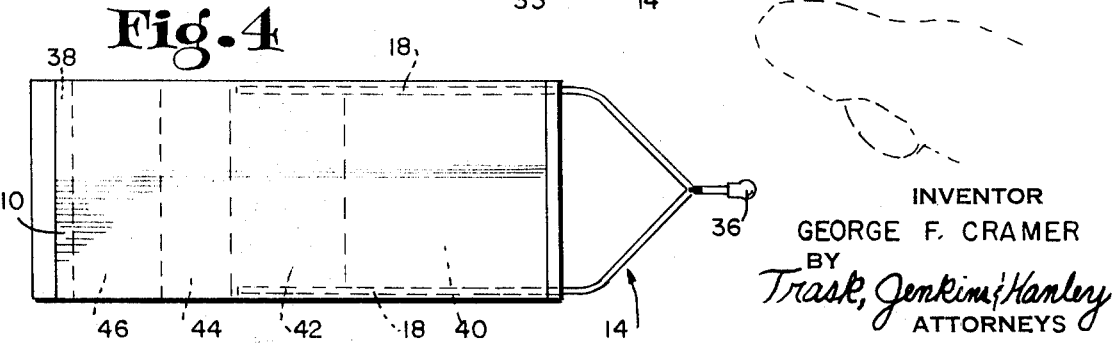
INVENTOR
GEORGE F. CRAMER
BY
Trask, Jenkins & Hanley
ATTORNEYS INVENTOR
GEORGE F. CRAMER
BY
Trask, Jenkins & Hanley
ATTORNEYS

EXPANDABLE TRAILER

BACKGROUND OF THE INVENTION

Many times it is necessary when using a trailer for hauling heavy objects, to tilt the trailer downward at its rearward end so that the objects may be easily loaded thereon. Presently, when such tilting movement is desired, it is necessary to unhitch the trailer and push the drawbar upwardly. These manipulations are time consuming and sometimes impossible to perform, so that it is often necessary to use a loading ramp. Therefore, it is an object of this invention to provide a trailer which is tiltable while the drawbar remains engaged with the towing vehicle.

Such tilting action is also useful in an expandable camping trailer, since the entrance to the trailer may be brought closer to ground level thereby doing away with the need for steps. It is desirable for a camping trailer to have a low profile so that the driver of the vehicle towing the trailer is not limited in his rearward vision. Such unlimited rearward vision is desirable both from a safety aspect and from a convenience aspect in that the trailer may be manipulated with a clear view of objects in its path. Furthermore, it is preferable that a camping trailer can be assembled or expanded in a minimum amount of time and with the slightest amount of effort. Therefore, it is another object of this invention to provide an expandable camping trailer which can be expanded to a large volume, and to lower the entrance area close to the ground, by movement of linkage members which are controlled by movement of the trailer's drawbar while said bar remains engaged with the towing vehicle.

SUMMARY OF THE INVENTION

In accordance with the invention, I have provided a tiltable trailer with one embodiment comprising a camper trailer having a tiltable bed and having a roof hinged at the rearward portion of the trailer to cover the entire bed. A plurality of linkage members are connected to the drawbar of the trailer for urging the roof of the trailer upwardly when the drawbar is drawn forward and the trailer bed is held against forward movement. Said plurality of linkages cause the forward end of the trailer bed to tilt downward thereby providing easier access to the interior of the expanded trailer. The hinge, which connects the rearward end of the roof to the trailer bed, may comprise a sliding hinge so that the rear end of the roof can also be raised slightly to provide more headroom within the trailer. A water tank may be disposed in the rearward portion of the trailer so that as the bed is lowered at its forward end, the rearward end thereof is elevated and the water facilities are supplied water by a gravity feed system.

In a second embodiment of the invention, I provide a trailer for hauling heavy objects, and being tiltable to the rear to permit easy loading and unloading of the objects. The drawbar of the trailer is formed of telescoping sections which are pinned in their extended relationship when the trailer is in a level position. A linkage member is pivotally attached at one end to the forward section of the drawbar, and is pivotally attached at its other end to the forward side of the trailer. The trailer is tilted by blocking its wheels against movement and forcing the telescoping sections of the drawbar to collapse in the rearward direction thereby causing said linkage to push upward on the front of the trailer and tilt it in the rearward direction.

BRIEF DESCRIPTION OF THE DRAWINGS

The accompanying drawings illustrate the invention. In such drawings:

FIG. 1 is a side elevation of an expandable trailer embodying the invention and showing the trailer in a collapsed condition;

FIG. 2 is a side elevation of the trailer shown in FIG. 1 in a partially expanded position;

FIG. 3 is a perspective view of the trailer shown in FIG. 1 in a fully expanded position;

FIG. 4 is a top view of the trailer shown in FIG. 1 with the roof lowered;

DETAILED DESCRIPTION OF THE PREFERRED EMBODIMENTS

Figure 5:
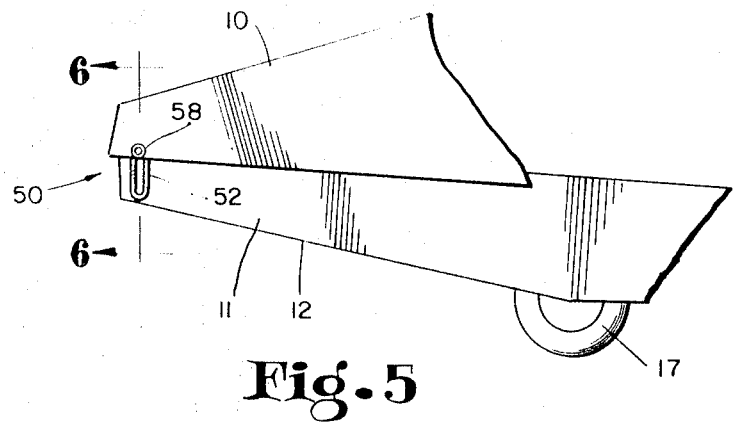
FIG. 5 is a partial view of the rear portion of the expanded trailer but showing a sliding hinge construction between its bed and roof portions.

One embodiment of my invention, as shown in FIGS. 1 through 6, comprises an expandable trailer having a roof portion 10 and a bed portion 12 hinged together at their rearward ends so that their forward ends may be widely separated to provide the roof and floor of a camping trailer. The roof has sidewalls 9 which enclose the sidewalls 11 of the trailer bed. When collapsed, the trailer has a low profile and preferably is only about 3 ½ feet tall so that the driver of a passenger vehicle 13 which is used to tow the trailer has unrestricted rear vision. A drawbar 14 is coupled to the trailer and is chained, as at 16, to the roof section 10 of the trailer so that as the trailer is being towed along a highway the roof cannot be raised inadvertently. Of course, the chain can be replaced by a pin or other means which hold the roof and bed portions together. When the trailer is to be expanded, the chain 16 is removed and the wheels 17 of the trailer are blocked against forward motion. The drawbar 14 is then drawn forward by the vehicle to cause a plurality of linkage members to tilt the forward end of the trailer downward and to raise the roof of the trailer.

The drawbar 14 has a pair of extensions 18 extending rearwardly along the bed of the trailer for pivotal connections 19 at their rearward ends to triangular linkages or cranks 20 which also extend rearwardly along the sides of the trailer bed 12. Short linkage arms 22 are pivotally connected respectively at their ends to the sidewalls of the forward end of the trailer bed, and to the drawbar sections 18, intermediate their lengths. Thus, movement of the drawbar 14 causes movement of the linkage arms 22 and the triangular cranks 20. When the trailer is in a collapsed and level position, the linkage arms 22 are in a substantially vertical position with their lower ends connected to the drawbar extensions 18 and disposed slightly to the rear of their upper ends. Preferably, the parallel sections 18 of the drawbar are pinned to the trailer, as shown at 24, when the trailer is in position to be towed, so that there is no load on the linkage members at such time. Each triangular crank 20 has pivotal connections at each of its corners, one corner being connected at 19 to the drawbar 18, a second corner being connected at 21 to the bed 12 of the trailer, and the third corner being connected at 25 to a roof-lifting linkages 26 are attached to the inner sides of said roof, approximately a third of the way from its rearward end, and thus are disposed with the triangular cranks in the gap between the sidewalls 9 and 11 of the roof and bed.

In the embodiment shown in FIGS. 1—6, when the trailer is closed, connections 21 of the triangular cranks 20 to the bed 12 are made at the lower portion of the bed, while their connections 19 to the extensions 18 of the drawbar are above their connections 21 to the bed and forward of their connections 25 to the third linkages 26. Said third linkages 26 are directed upwardly and to the rear from their connections with the bed to their connections 25 with the triangular cranks 20. Therefore, as can be seen from the drawings, if the trailer is prevented from moving forward, such as by chocking the wheels 17 thereof, and if a forward force is exerted on the drawbar 14, then the linkage arms 22 will be rotated forwardly from their substantially vertical position; and, at the same time the pivotal connections 19 at the ends of the drawbar extensions 18 will pull the triangular cranks 20 forwardly, rotating them about their connections 21 to the trailer bed 12 and causing them to pull the third linkages 26 upwardly. With this sequence of linkage movements, the linkage arms 22 allow the forward end of the trailer bed to descend as the bed rotates about the axle of the wheels 17; and, the roof 10 of the trailer is raised at the forward end thereof as said roof is pulled upwardly by the third linkages 26 and pivots about the rearwardly disposed hinge 27. The trailer wheels 17 are disposed about two-thirds of the way from the front to the rear of the trailer, and therefore the floor of the trailer bed angles upwardly toward the front when the trailer is collapsed, so that said forward portion of the floor will be level when the trailer is expanded.

When the trailer is in a fully expanded or open position, the several linkages 20, 22, and 26 all remain in a cocked position relative to their connections to the trailer, such that reverse movement of the drawbar 14 causes said linkages to rotate back to their original position. Thus, when the trailer is to be collapsed, it is held against rearward movement, as by changing the position of the wheel chocks, and then the drawbar 14 is forced rearwardly.

The expanded trailer may be provided with canvas sidewalls 28 and a forward wall 30 having a flap 32 which serves as a doorway. Said side and forward walls 30 and 32 may be permanently fastened to the roof 10 and trailer bed 12, and being flexible they will automatically collapse or extend with corresponding action of the trailer. A pair of support legs 33 extend downwardly from the front of the trailer bed to give the trailer a firm support when it is in an expanded position. The legs 33 permit the expanded trailer to be supported independently of the vehicle suspension system.

The connection between the drawbar 14 and the towing vehicle is preferably formed by a ball 34 and socket 36. The linkages and drawbar are arranged such that the socket 36 of the drawbar may remain at the same height while the trailer is expanded or collapsed, and therefore, the forward and reverse forces on the drawbar 14 may be exerted by the towing vehicle. This means that no manual work need be performed except for chocking the wheels 17, and that all the work required to expand or collapse the trailer may be performed by the towing vehicle.

The interior of the trailer, as shown in FIG. 4, may be arranged in any desirable manner, but preferably a water tank 38 is placed at the rear of the trailer bed, and thereby will be raised as the trailer is expanded. As seen in FIG. 3, the rear of the trailer bed is the highest portion thereof, and water from the tank can be provided at any other point in the trailer by a gravity feed system. Assuming the trailer bed 12 has width and height dimensions of about 7 feet by 20 feet, the trailer may be arranged with a living area 40 at the forward end; a cooking and dining area 42 in the center; next, a shower, lavatory, and storage area 44; and, a sleeping area 46 at the rear, supported on a platform which compensates for the sloped floor at the rear of the trailer.

Figure 6:
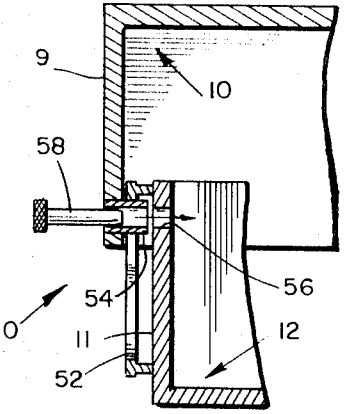
FIG. 6 is an enlarged transverse section taken along line 6—6 of FIG. 5.

As a modification to the embodiment shown in FIGS. 1—3, the roof and trailer bed may be hinged by a sliding hinge 50, as shown in FIGS. 5 and 6, which permits the roof to be raised at its rearward end after the trailer is expanded thereby providing more headroom toward the rear of the trailer. The sliding hinge 50 may take one of many forms, and is shown as comprising a pair of notched bars 52, one fixed at each side of the trailer bed. In the lowered position, a hollow shaft 54 is seated at the bottom of each notch and is rotatable thereat, while being fixedly attached to the roof 10. When the rear end of the roof is raised, the shafts 54 are guided upwardly in the notches to a point where the axes of the shafts 54 are aligned with holes 56 in the sidewalls of the trailer bed. Pins 58 may be passed through the shafts 54 and into the holes 56 to support the roof in its raised position. The roof may be pushed up easily since it is supported near its center of gravity on a fulcrum formed by the cranks 20. Thus, manipulation of the sliding hinge may be accomplished with little effort.

Figure 7:
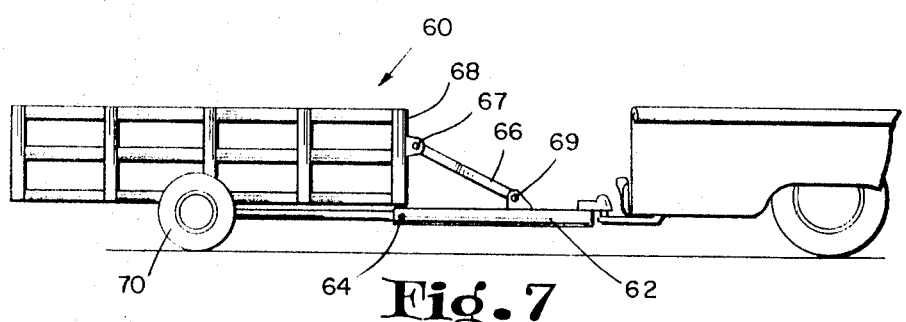
FIG. 7 is a side elevation of an equipment-hauling trailer embodying the invention.
Figure 8:
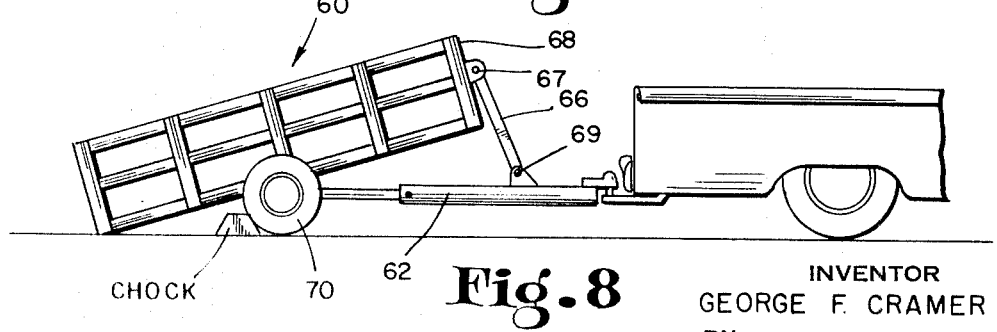
FIG. 8 is a side elevation of the trailer shown in FIG. 7 in a tilted position.

A tiltable trailer 60 for hauling heavy objects forms a second embodiment of the invention, and is shown in FIGS. 7 and 8 as having a telescoping drawbar 62 pivotally connected to the underside of the trailer near its axis of tilting movement. The telescoping drawbar is pinned as at 64 to prevent its collapse when the trailer is in a position to be towed. A linkage member 66 is pivotally attached at 67 to the forward wall 68 of the trailer 60 and extends downwardly and forwardly therefrom to a pivotal connection 69 on the drawbar 62. When it is desired to tilt the trailer rearwardly the pin 64 is removed, and the trailer is held against rearward movement as by blocking its wheels 70. The drawbar 62 is then forced rearwardly causing it to collapse in a telescoping manner so that the linkage member 66 pushes the forward portion 68 of the trailer upwardly thereby tilting the bed of the trailer. When loading of the trailer 60 has been completed, the drawbar 62 is again extended thereby releveling the trailer whereupon the drawbar is repinned so that it cannot collapse inadvertently.

I claim:

1. A trailer for coupling to a vehicle, comprising
   a bed portion having an operative position and a towing position in which it is tilted,
   a roof portion movably attached to said bed portion and movable between a collapsed position and a raised position,
   a plurality of wheels for supporting said bed portion,
   a drawbar attached to said trailer for coupling to the vehicle, said drawbar having a towing position relative to said bed portion when the bed portion is in said tilted towing position and said drawbar being movable from said towing position, and linkage means connected between the drawbar and said roof and said bed portion and operative in response to movement of the drawbar from its towing position to move the bed portion from its said tilted towing position toward its operative position and simultaneously to move the roof from its collapsed position toward its raised position.

2. A trailer for coupling to a vehicle, comprising
   a bed portion having an operative position and a towing position in which it is tilted,
   a roof portion movably attached to said bed portion and movable between a collapsed position and a raised position,
   a plurality of wheels for supporting said bed portion,
   a drawbar attached to said trailer for coupling to the vehicle,
   said bed portion having a predetermined position relative to said drawbar when the bed portion is in tilted towing position and being movable relative to the drawbar to its operative position, and linkage means connected between said drawbar and said roof and bed portion and operative in response to movement of the bed portion relative to the drawbar from its tilted towing position toward its operative position to simultaneously move the roof from its collapsed position toward its raised position.

3. A trailer for coupling to a vehicle, comprising a bed portion, a roof hingedly attached to the rear of said bed portion, a plurality of wheels for supporting said bed portion, a drawbar movably attached to said trailer for coupling to the vehicle, and linkage means pivotally connected to said roof and bed portion for pushing the forward ends of said roof and bed upwardly and downwardly, respectively, as said drawbar is moved longitudinally with respect to said bed portion.

4. The invention as set forth in claim 3 in which said drawbar is provided with parallel extensions along the sides of said bed portion, and said linkage means comprise a pair of linkage arms pivotally connected at spaced points to the forward section of the bed portion and to the drawbar extensions, a pair of second linkages disposed on opposite sides of said bed portion and having corners which form a triangular pattern, and a pair of roof-lifting third linkages having their ends pivotally connected to said roof and one set of corners of the second linkages, a second set of corners of the second linkages being pivotally connected to the trailer bed, and the third set of corners of the second levers being pivotally connected to the ends of said drawbar extensions.

5. The invention as set forth in claim 3 in which said roof and trailer bed are hingedly connected by sliding hinge means which permit the rear portion of the roof to be lifted and releasably retained at a height above that effected by actuation of said roof-lifting third linkages.

6. The tiltable trailer as set forth in claim 3, in which a water tank is mounted within the rear portion of the bed portion for providing a gravity feed water system for the trailer as the forward portion of said bed portion is lowered and the rear portion elevated.

7. The invention as set forth in claim 3 in which collapsible sidewalls are interconnected between the roof and bed portion for enclosing the space within the trailer and for collapsing and extending with corresponding action between the roof and bed portion.

PO-1050
(5/69)

UNITED STATES PATENT OFFICE
CERTIFICATE OF CORRECTION

Patent No. __3,591,230__            Dated __July 6, 1971__

Inventor(s) __George F. Cramer__

It is certified that error appears in the above-identified patent and that said Letters Patent are hereby corrected as shown below:

Column 2, line 55, between "roof-lifting" and "link-" insert -- third linkage 26. The opposed ends of the roof-lifting --.

Signed and sealed this 4th day of January 1972.

(SEAL)
Attest:

EDWARD M. FLETCHER, JR.          ROBERT GOTTSCHALK
Attesting Officer                  Acting Commissioner of Patents